United States Patent
Holbrook (12) 
(10) Patent No.: US 6,347,780 B1
(45) Date of Patent: Feb. 19, 2002

(54) DEVICE FOR HANGING DECORATIVE LIGHTING

(76) Inventor: Paul Robert Holbrook, 2218 Maramar La., Buffalo Grove, IL (US) 60089

( * ) Notice: Subject to any disclaimer, the term of this patent is extended or adjusted under 35 U.S.C. 154(b) by 0 days.

(21) Appl. No.: 09/511,295

(22) Filed: Feb. 23, 2000

(51) Int. Cl.$^7$ ............................................. F16M 13/00
(52) U.S. Cl. .................. 248/544; 248/48.1; 248/227.1; 248/231.41
(58) Field of Search ................................ 248/544, 48.1, 248/48.2, 227.1, 227.2, 227.4, 229.12, 231.41, 228.3

(56) References Cited

U.S. PATENT DOCUMENTS

| | | | |
|---|---|---|---|
| 1,431,485 A | * | 10/1922 | Peck |
| 3,182,944 A | * | 5/1965 | Laviano |
| 3,376,006 A | * | 4/1968 | Zezula |
| 4,098,479 A | * | 7/1978 | Hartstone et al. |
| 4,491,902 A | * | 1/1985 | Cangelosi |
| 5,141,192 A | * | 8/1992 | Adams |
| 5,188,332 A | * | 2/1993 | Callas |
| 5,496,005 A | * | 3/1996 | Dieringer |
| 5,669,709 A | * | 9/1997 | Adams |
| 6,182,933 B1 | * | 2/2001 | Rapp |

* cited by examiner

Primary Examiner—Anita King
Assistant Examiner—Korie H. Chan (57) ABSTRACT

System to easily install and remove hangers for a string of decorative lights around a house, while standing on the ground and without the use of a ladder. The system is particularly intended for attachment to gutter lips, but could be used to attach light strings to a variety of surfaces found on buildings. The system is comprised of two components, a hanger clip which holds the light string and which has spring loaded jaws to attach to the building, and an elongated staff with hanger clip actuator at one end to temporarily hold the clip until it can be positioned and attached. The staff has an actuating means which opens and closes the hanger clip jaws. In use, the actuating means is used to open the hanger clip jaws, the clip is then positioned on top of the gutter lip or other surface, and then the actuating means is used again to close the hanger clip jaws, allowing the clip to be firmly attached to the gutter lip or other surface. The hanger clip actuator is adapted such that the clip may be rotated in two different axes, if the user wishes to install the clip onto surfaces other than a gutter lip, for example a piece of trim or a light fixture.

11 Claims, 7 Drawing Sheets

DEVICE FOR HANGING DECORATIVE LIGHTING

RELATED APPLICATIONS

None

FEDERALLY SPONSORED RESEARCH/ DEVELOPMENT

None

MICROFICHE APPENDIX

None

BACKGROUND OF THE INVENTION

1. Field of the Invention

The present invention relates to a method of installing and displaying decorative lights, such as a continuous strand of Christmas lights, around a house, while standing on the ground, and without the necessity of having to use a ladder.

2. Prior Art

There are a large number of patents related to this field, but only one, U.S. Pat. No. 5,141,192, specifically addresses a solution for installing decorative light hangers to an elevated part of a house, specifically a gutter lip, while standing on the ground and without the use of a ladder. This patent requires the use of an elongated staff with horizontal rod mounted at one end. In practice, however, this solution requires a difficult and delicate operation to get the hook to seat properly on the wide variety of gutter lips found on houses, particularly when the desired mounting location is at a fairly high elevation (11 feet or more on many houses).

SUMMARY OF THE INVENTION

This invention provides a system to easily install and remove hangers for a string of decorative lights around a house, while standing on the ground and without requiring the use of a ladder. The system is particularly intended for attachment to gutter lips, but could be used to attach light strings to a variety of surfaces found on buildings. The system is comprised of two components, a spring-loaded hanger clip which holds the light string, and an elongated staff with hanger clip actuator at one end (hereinafter referred to as the distal end) to temporarily hold the clip until it can be positioned and installed on the gutter lip. The elongated staff has an actuating means which opens and closes the jaws of the hanger clip. In the preferred embodiment, the actuating means is a piece of string. The string connects the hanger clip actuator to an operating means at a further end (hereinafter referred to as the butt end). In the preferred embodiment, the operating means is a hand actuated slider. The user slides the hand actuator toward the butt end, causing the hanger clip jaws to open. The clip is then rested on top of the gutter lip, and the hand actuator is slid toward the distal end, causing the clip jaws to close and firmly grip the gutter. The hanger clip actuator is adapted such that the clip may be rotated in two different axes, if the user wishes to install the clip onto surfaces other than a gutter lip, for example a piece of trim or a light fixture.

In the preferred embodiment, the jaws of the hanger clip are spring loaded and biased in the normally closed position.

In use, the user would first attach the light string to the hanger clip using the clip's light string retainer. The user then squeezes the two jaws of the hanger clip apart slightly, using two finger grasping areas on the clip. The clip is then inserted onto the hanger clip actuator at the distal end of the staff. The user then releases the clip, and the clip is temporarily retained by positive engagement features on the clip interacting with corresponding negative features on the hanger clip actuator. The hanger clip spring force assures that the clip will be retained on the hanger clip actuator. Using the staff, the user then positions the clip above the gutter lip, and then slides the hand actuator toward the butt end, which opens the jaws of the hanger clip. The clip is then positioned on top of the gutter lip, the hand actuator is slid toward the distal end, and the spring force of the hanger clip spring causes the hanger clip jaws to close and the hanger clip actuator to return to the full open position, releasing the hanger clip. The clip is now securely attached to the gutter lip.

For removal, the reverse process if followed.

For attachment to surfaces other than gutter lips (for example, a piece of vertical trim), it may be necessary to position the clip jaws at other orientations. For this reason, the hanger clip actuator may be rotated from 0 to 360 degrees, with the axis of rotation essentially parallel to the axis along which the hanger clip jaws open and close. In addition, the entire upper portion of the staff may be rotated up to 90 degrees on an axis which is perpendicular to the axis along which the hanger clip jaws open and close, and temporarily locked there. These two additional degrees of freedom allow the attachment of the clip to a wide variety of surfaces, whether horizontal, vertical, or angled. In the preferred embodiment, the hanger clip jaws have surfaces which specifically contour to common gutter lips to better grasp the lip, and are also serrated so that they may securely grasp a wide variety of surfaces in addition to gutter lips. By design, the surfaces on the jaws which contour to gutter lips do not preclude using the clip on other surfaces.

BRIEF DESCRIPTION OF THE DRAWINGS

The foregoing aspects and other features of the present invention are explained in the following description, taken in combination with the accompanying drawings, wherein:

FIG. 2 shows the hanger clip not yet temporarily installed onto the elongated staff.

FIG. 3 shows the hanger clip temporarily installed onto the elongated staff, with the hanger clip jaws in a closed position.

FIG. 4 shows the hanger clip jaws in an open position.

FIG. 5 shows the hanger clip positioned on a gutter lip, with the jaws still in an open position.

FIG. 6 shows the hanger clip firmly attached to the gutter lip.

DETAILED DESCRIPTION OF THE INVENTION

Figure 1:
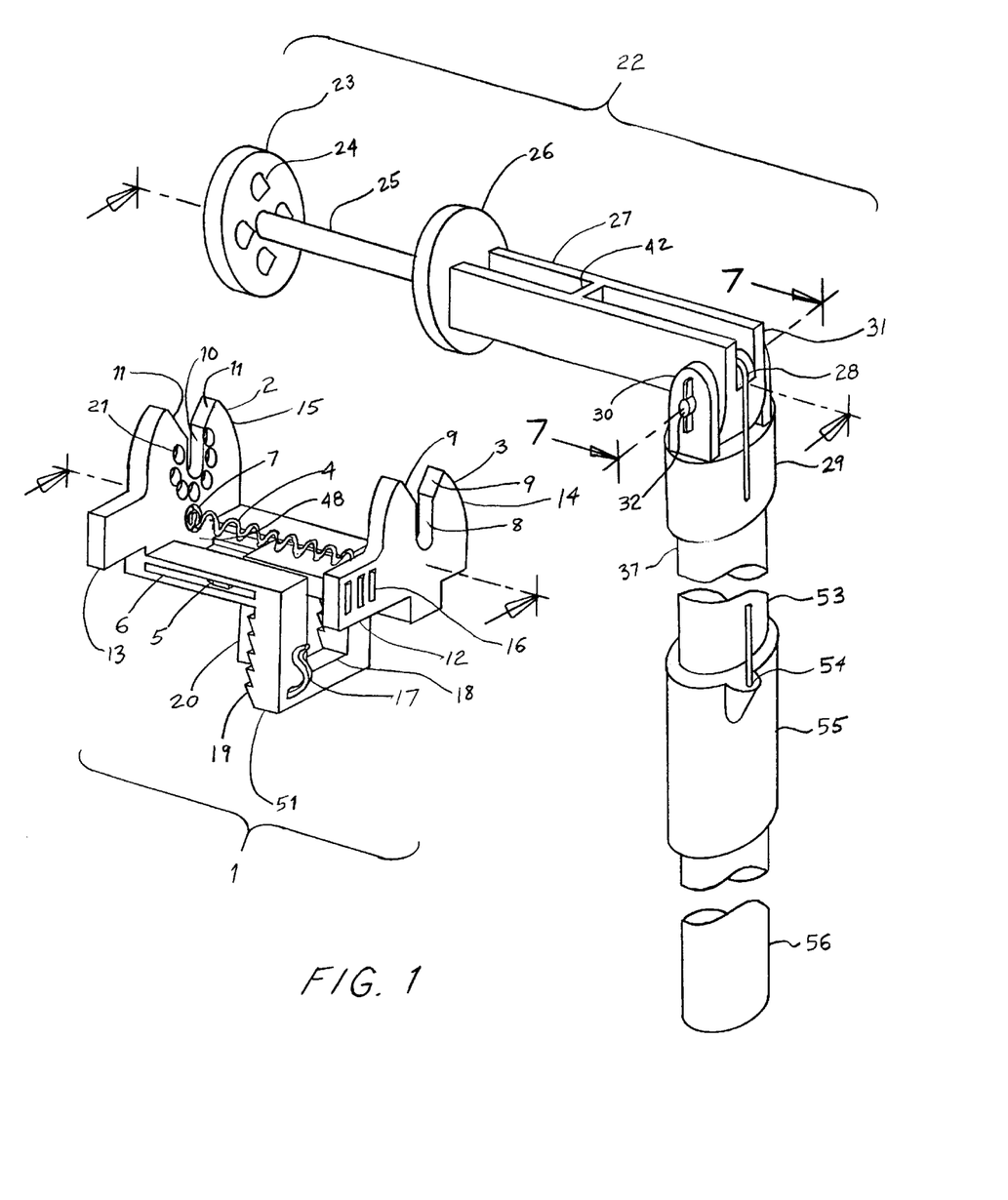
FIG. 1 is a perspective view of the hanger clip and elongated staff.

Referring to FIG. 1, there is shown a perspective view of the hanger clip and elongated staff. Although the present invention will be described with reference to the single embodiment shown in the drawings, it should be understood that the present invention can be embodied in many alternate forms or embodiments. In addition, any suitable size, shape or type of elements or materials could be used.

Still referring to FIG. 1, the hanger clip assembly 1 is comprised of two sliding members, 2 and 3, with a compression-type coil spring 4 mounted between them. The coil spring 4 provides a bias to force section 15 of sliding member 2 and section 14 of sliding member 3 in an outward direction. This same spring force also causes jaw 51 of sliding member 2 and jaw 20 of sliding member 3 to be biased in a closed position as shown. Jaw 51 has serrations 19 which provide for better retention when hanger clip assembly 1 is mounted to a surface. Two tabs 5 of sliding member 3 slide in corresponding slots 6 of sliding member 2, and provide for secure sliding retention of the two members. Coil spring 4 is restrained from radial motion by mounting in depression 7 of section 15 in sliding member 2. Section 15 of sliding member 2 has slot 10 and section 14 of sliding member 3 has corresponding slot 8, which will accept shaft portion 25 of hanger clip actuator 23 when hanger clip assembly 1 is installed onto elongated staff assembly. Slots 8 and 10 transition into tapered sections 9 and 11, to provide for easier location and alignment of shaft 25 into slots 8 and 10. Sliding member 2 has finger grasping area 13, and sliding member 3 has corresponding finger grasping area 12. A series of ridges 16 on finger grasping area 12 provide for better grasping. Sliding member 2 has light string retainer 17. In the preferred embodiment, the light string retainer is a spring loaded clip. Section 15 of sliding member 2 has a series of holes 21 which will accept cone shaped protrusions 24 of hanger clip actuator 23 of elongated staff 22, when hanger clip assembly 1 is installed onto elongated staff assembly. Elongated staff assembly 22 has housing 27, hanger clip actuator 23, string 28 and staff 56. Housing 27 is rotationally mounted in mounting bracket 29, and may be secured at various rotational orientations by tightening lock nut 32. Mounting bracket 29 is attached to extreme upper portion 37 of staff 56. String 28 is secured at attachment point 54 of hand actuator 55, which is slidably mounted onto middle portion 53 of staff 56. Housing 27 has flat section 31, such that rotation of more than 90 degrees of housing 27 with respect to mounting bracket 29 is prevented, as rotation beyond 90 degrees provides no benefit.

Figure 2:
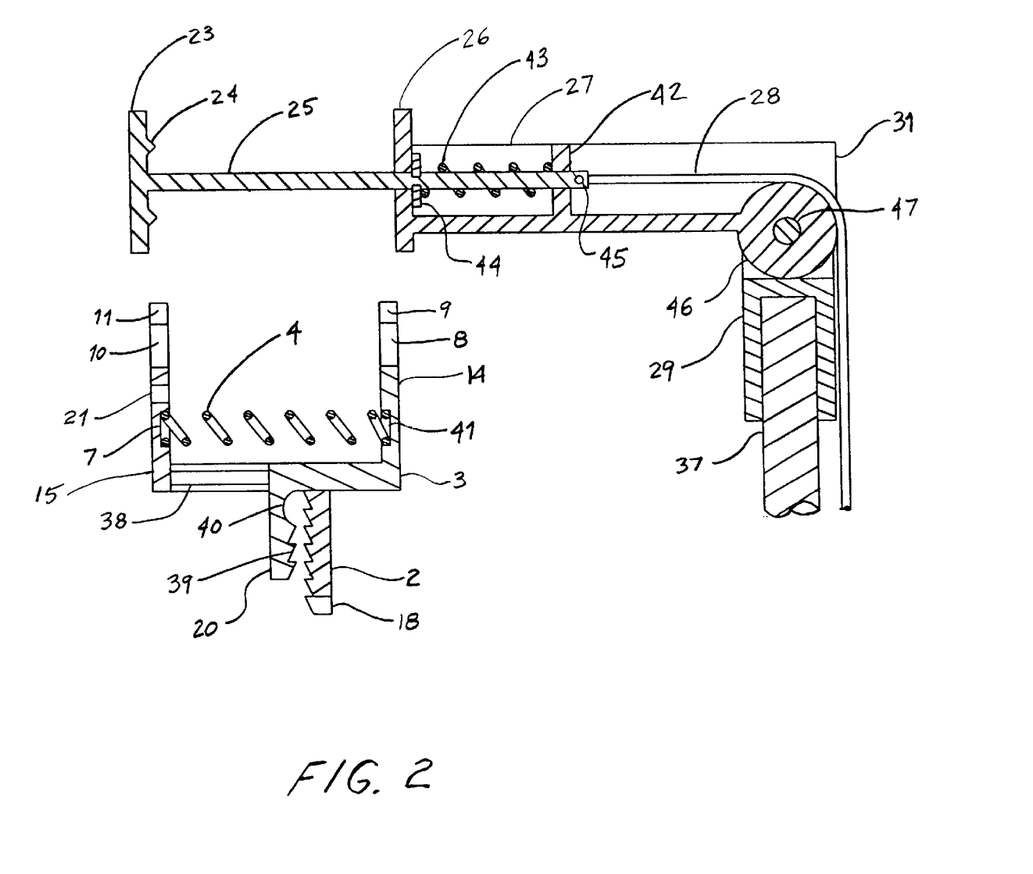
FIGS. 2 through 6 are section views of the hanger clip and elongated staff, taken through the axis along which the hanger clip opens and closes, in various usage positions.

Referring now to FIG. 2, hanger clip assembly is positioned ready to be installed onto elongated staff. Coil spring 4 can be seen mounted in depression 7 of section 15 of sliding member 2 and depression 41 of section 14 of sliding member 3. Jaw 20 of sliding member 3 has serrations 39 to provide for better retention when hanger clip is mounted to a surface. Jaw 20 also has section 40 which is intended to specifically contour to a gutter lip to provide for better retention. Hanger clip actuator 23 of elongated staff assembly is biased in the open position by compression-type coil spring 43, which is captured between wall 42 of housing 27 and retainer 44 of shaft 25. String 28 is attached to shaft 25 at point 45. Screw 47 is shown in section 46 of housing 27.

Figure 3:
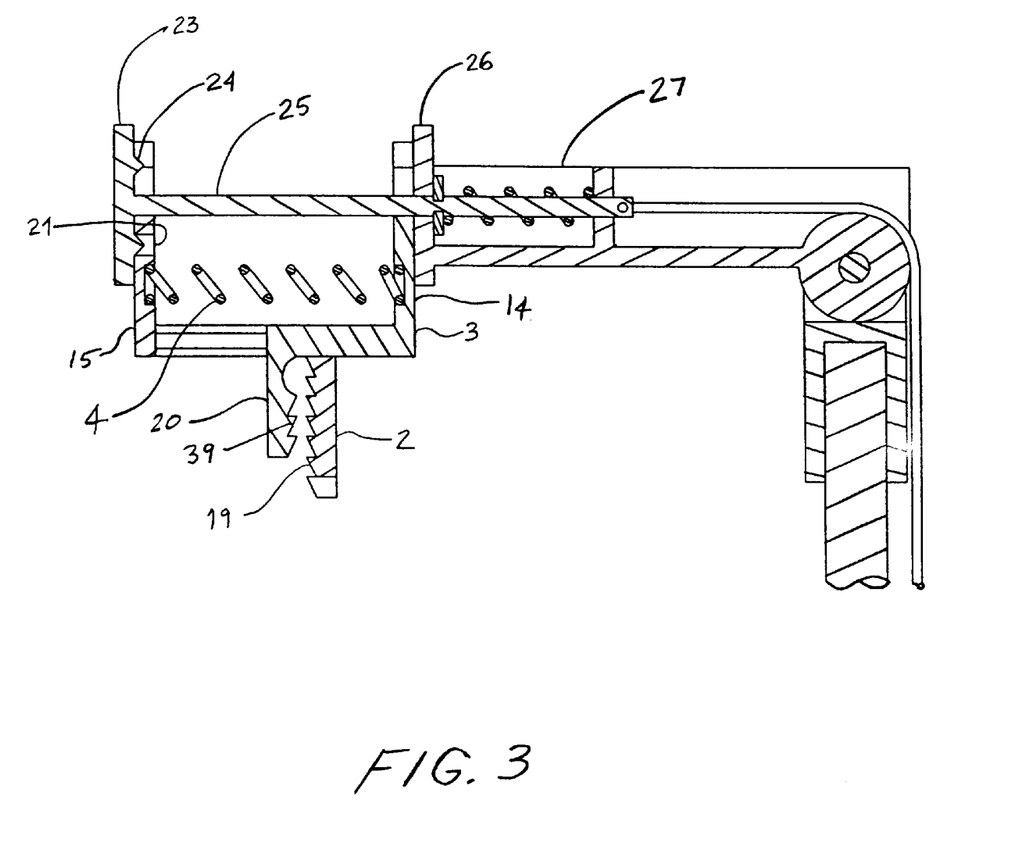

Referring now to FIG. 3, hanger clip assembly is shown installed onto elongated staff assembly. Hanger clip is retained between section 26 of housing 27 and protrusions 24 of hanger clip actuator 23, with outward biased force provided by coil spring 4. Protrusions 24 are shown inserted into holes 21 of section 15 of sliding member 2.

Figure 4:
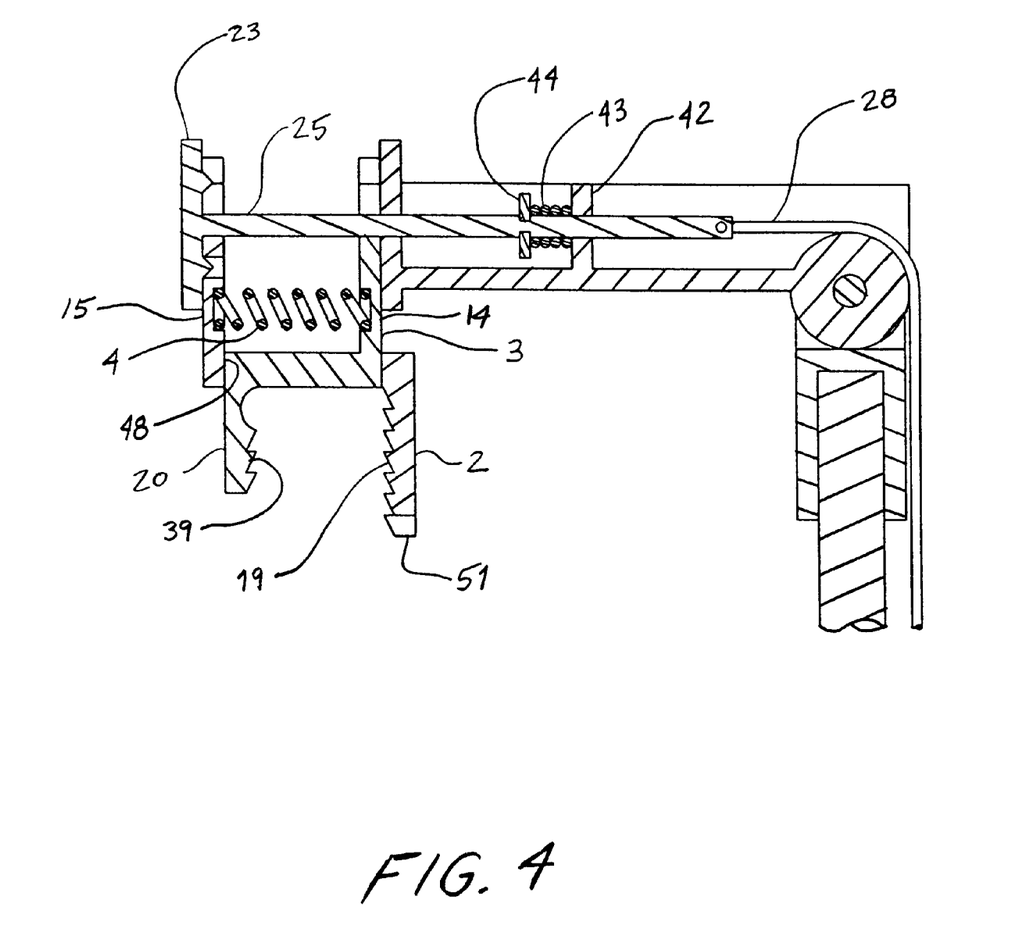

Referring now to FIG. 4, string 28 has been pulled. String 28 pulls shaft portion 25 of hanger clip actuator 23, causing coil springs 43 and 4 to compress, forcing sections 14 and 15 of hanger clip assembly to close, also causing jaws 20 and 51 of hanger clip assembly to open to fullest extent.

Figure 5:
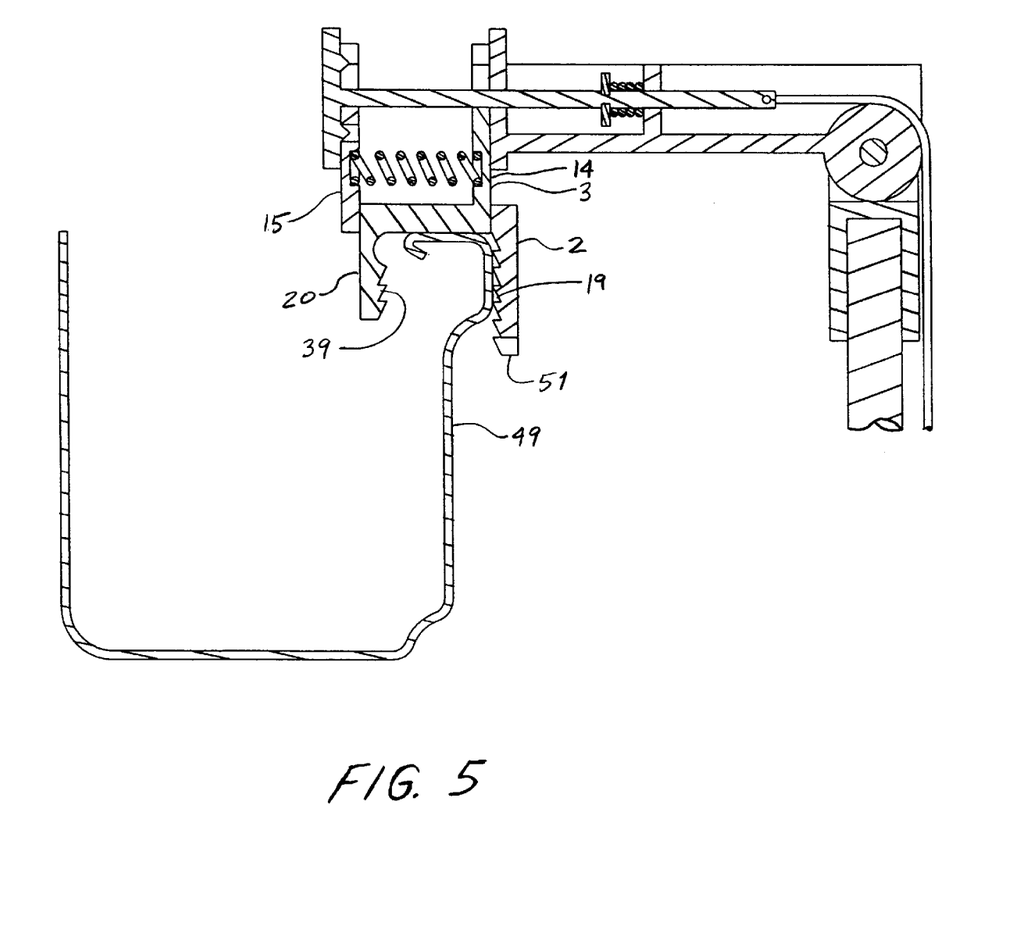

Referring now to FIG. 5, with the jaws 20 and 51 of hanger clip assembly still in full open position, the hanger clip assembly is placed on top of a gutter 49.

Figure 6:
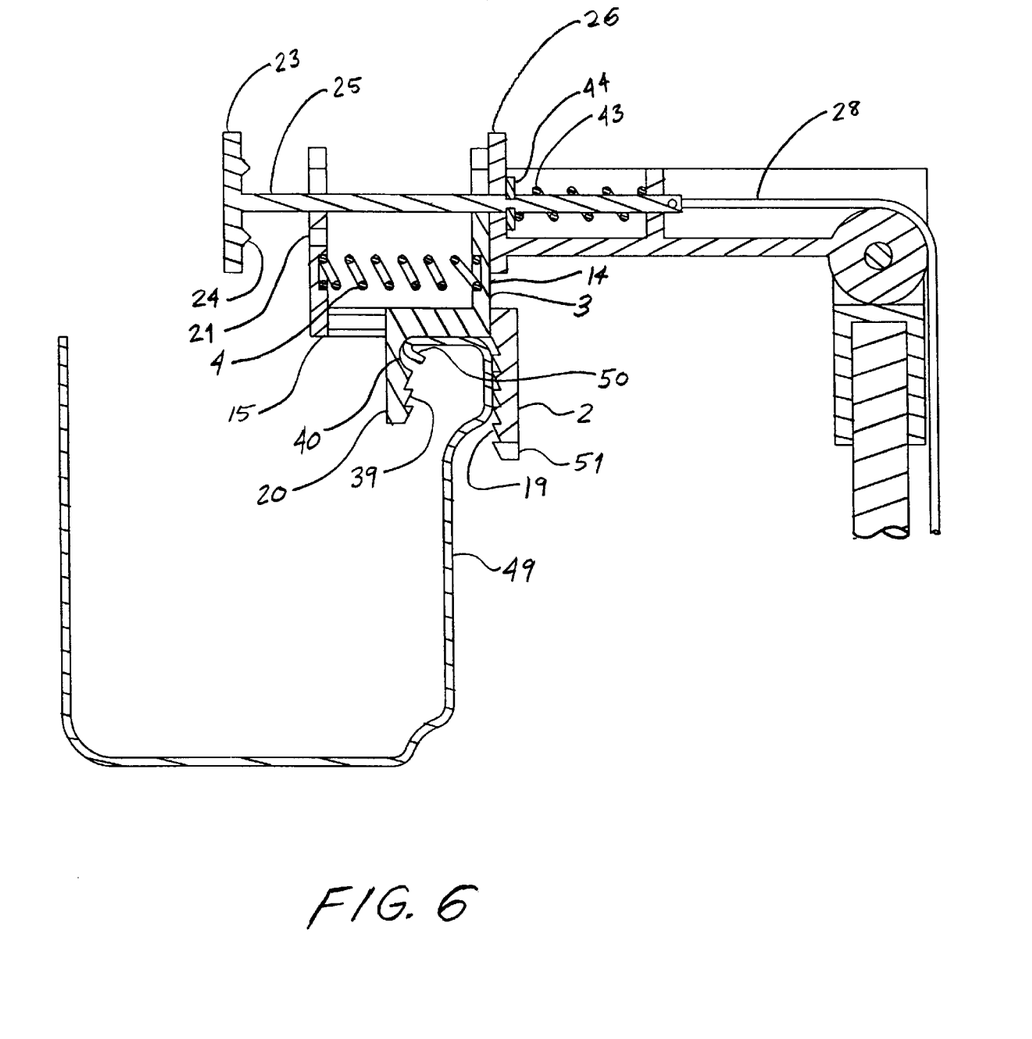

Referring now to FIG. 6, string 28 is released, allowing coil spring 4 to expand, and causing jaws 20 and 51 of hanger clip assembly to firmly grasp gutter 49. Hanger clip assembly is held onto gutter by serrations 19 of jaw 51 and section 40 of jaw 20, which specifically contours to section 56 of gutter 49. Coil spring 43 causes hanger clip actuator 23 to open to its fullest extent, disengaging protrusions 24 from holes 21, and disengaging the elongated staff assembly from the hanger clip assembly. The elongated staff assembly is then moved upward and the clip is completely installed. For removal, the reverse process is followed.

Figure 7:
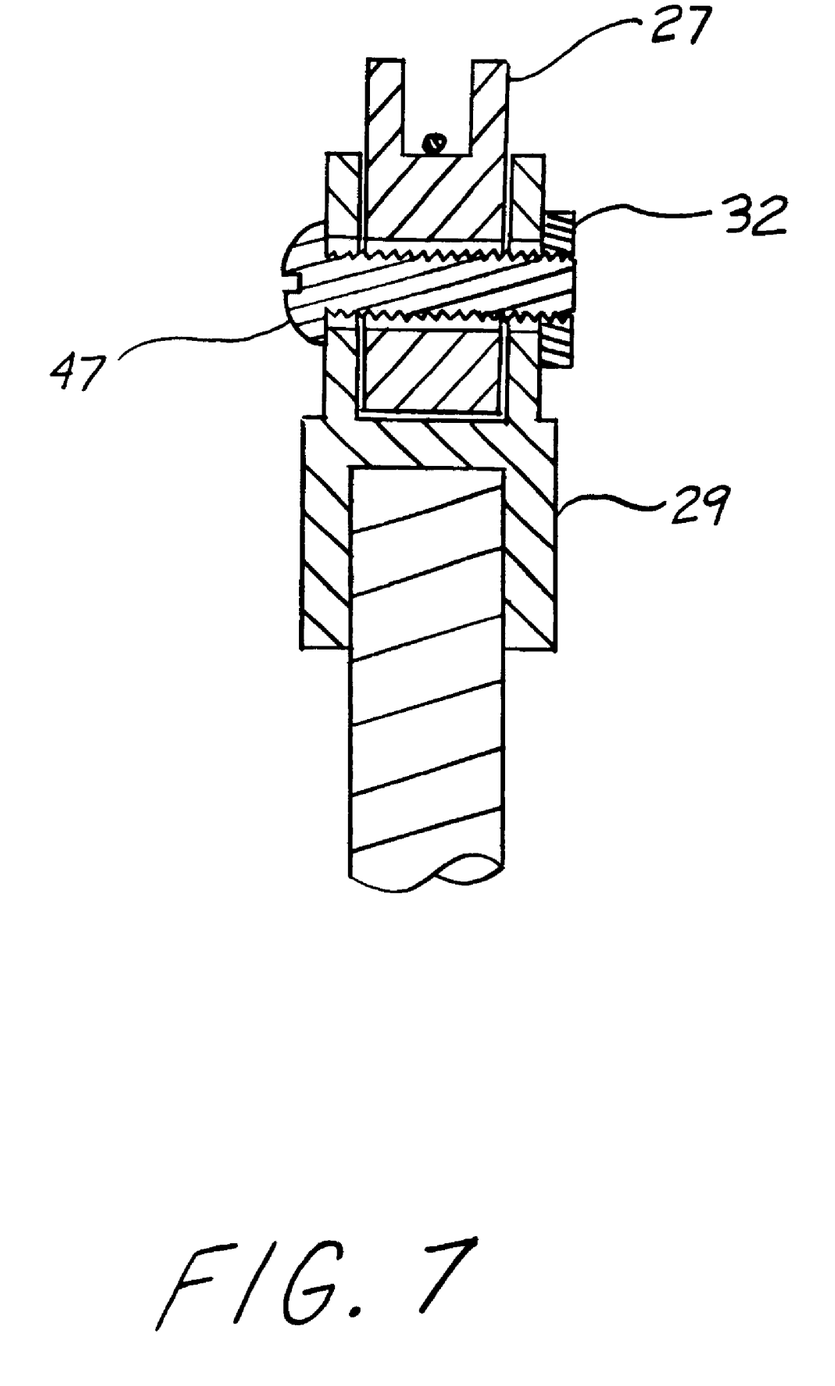
FIG. 7 is a section view through the axis about which the hanger clip actuator rotates on the elongated staff.

Referring now to FIG. 7, housing 27 of elongated staff assembly 22 rotates about mounting bracket 29 on an axis coincident with that of screw 47. Housing 27 may be secured at various rotational orientations on mounting bracket by tightening nut 32 on screw 47.

It should be understood that the foregoing description is only illustrative of the invention. Various alternatives and modifications can be devised by those skilled in the art without departing from the invention. Accordingly, the present invention in intended to embrace all such alternatives, modifications and variances that fall within the scope of the appended claims.

What is claimed is:

1. Device for installing and removing hangers for strings of decorative lights to a house, comprising:

A hanger clip having spring loaded jaws, with said jaws biased in the normally closed position, with said hanger clip having a light string retainer, and an elongated staff for installing and removing said hanger clip having a hanger clip actuator disposed at one end of said elongated staff to engage said clip jaws for opening and closing said spring loaded jaws, operating means at a further end of said elongated staff, and actuating means connecting said operating means and hanger clip actuator, such that when said actuating means is in a first given position, said hanger clip actuator closes said hanger clip jaws, and when said actuating means is actuated to an alternate position, said hanger clip actuator opens said hanger clip jaws.

2. A device as described in claim 1, wherein said hanger clip actuator is a spring loaded member biased in the normally open position, such that when said actuating means is actuated to said alternate position, said spring of said member is actuated, thereby closing said spring loaded member and opening said hanger clip jaws, and when said actuating means is released, said spring of said member causes said member to return to full open position, thereby allowing said hanger clip jaws to close, also causing said actuating means to return to said first position.

3. A device as described in claim 1, wherein said actuating means is a string.

4. A device as described in claim 1, wherein said jaws have serrations to provide better grasping to a variety of shapes and surfaces.

5. A device as described in claim 1, wherein at least one of said jaws has a feature which specifically contours to a gutter lip.

6. A device as described in claim 1, wherein said hanger clip has retaining features which correspond to mating features on said hanger clip actuator, such that when the two sets of features are engaged, said hanger clip is temporarily and securely held onto said hanger clip actuator.

7. A device as described in claim 6, wherein said two sets of retaining features engage in a direction along an axis essentially parallel to the axis along which said hanger clip jaws open and close, such that said spring loaded action of said hanger clip jaws provides a force to keep said hanger clip securely and temporarily engaged onto said hanger clip actuator.

8. A device as described in claim 1, wherein said light string retainer of said clip is a spring loaded member.

9. A device as described in claim 1, wherein said hanger clip actuator may be rotated up to 90 degrees, with rotation axis essentially perpendicular to the axis along which said hanger clip jaws open and close.

10. A device as described in claim 9, wherein said hanger clip actuator and said elongated staff are engaged by locking means, to selectively and temporarily lock the hanger clip actuator at a desired rotation angle.

11. A device as described in claim 10, wherein said locking means is comprised of a screw and nut type combination, with screw axis essentially coincident with axis of rotation.

* * * * *